July 4, 1961   P. C. ANDREWS   2,991,116
VEHICLE LIGHTING SYSTEM AND STRUCTURE THEREFOR
Filed Dec. 3, 1959   3 Sheets-Sheet 2
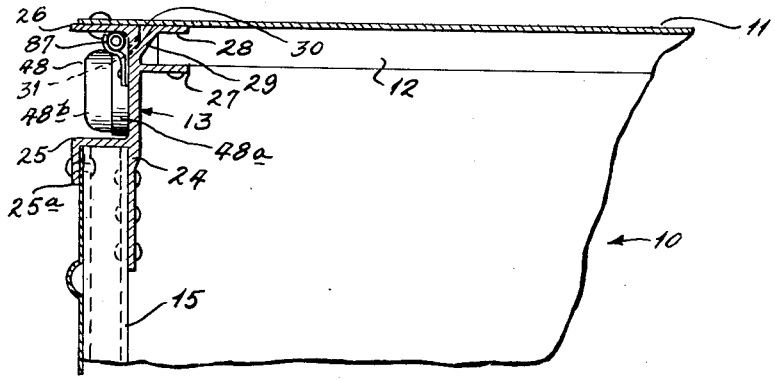
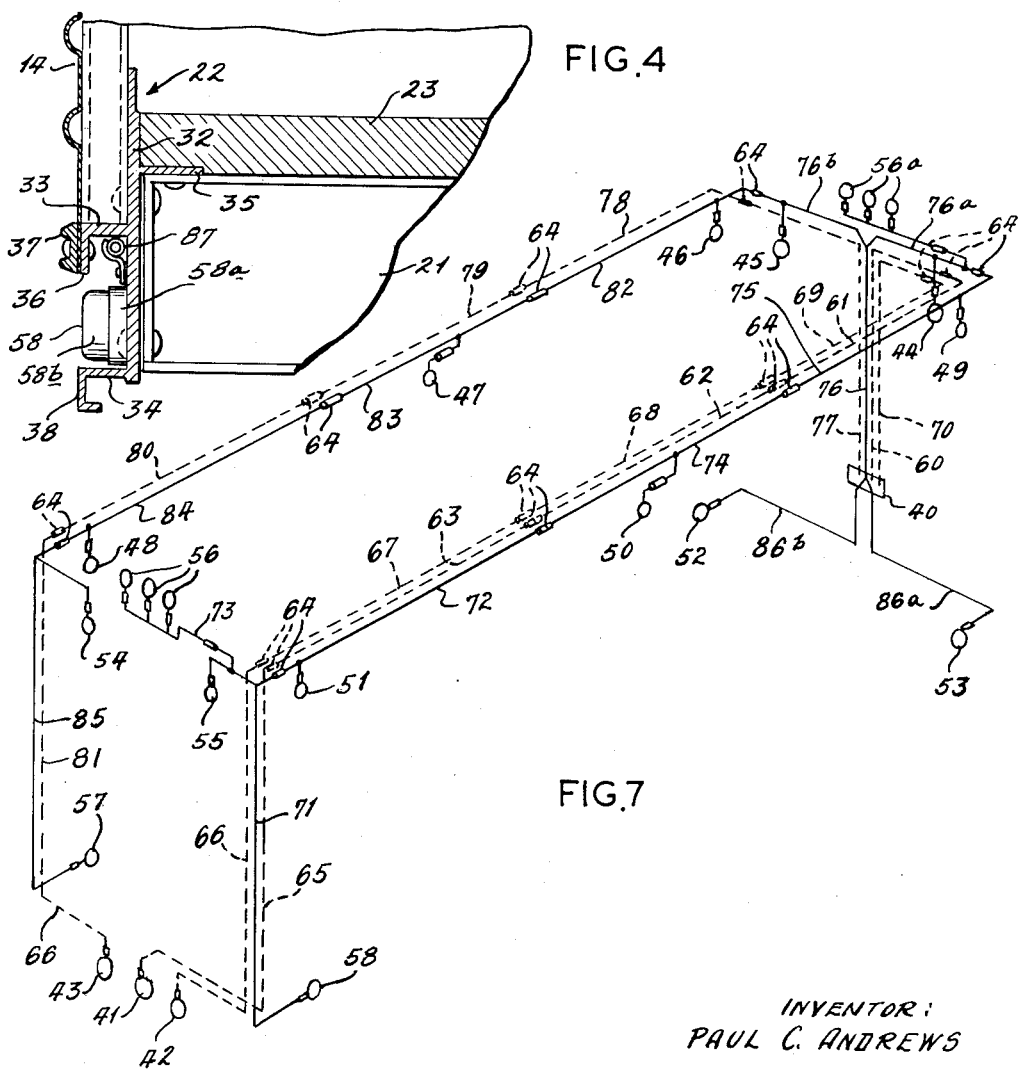
INVENTOR:
PAUL C. ANDREWS
BY Gravely, Lieder & Woodruff
ATTORNEYS.

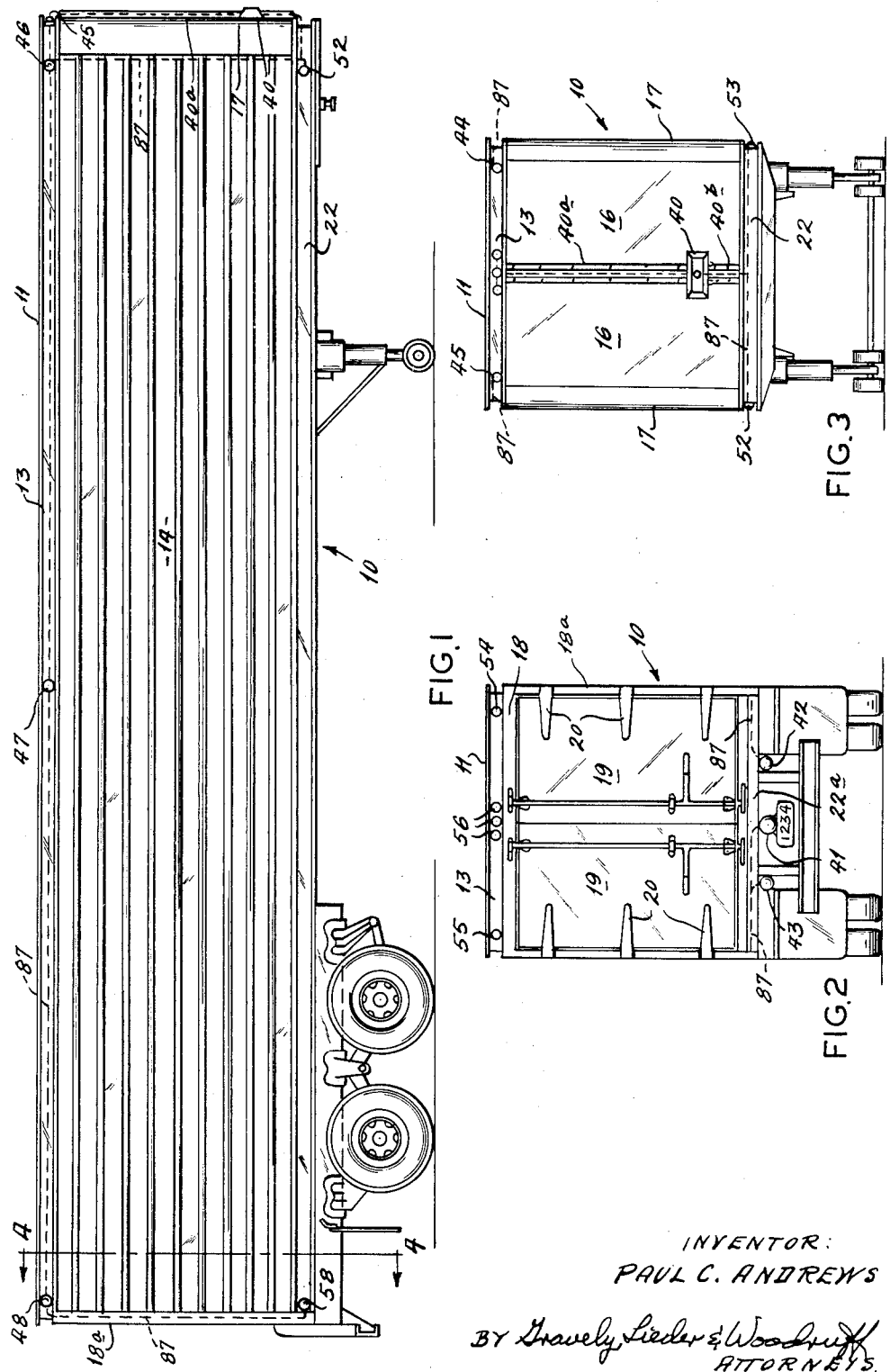

July 4, 1961 P. C. ANDREWS 2,991,116
VEHICLE LIGHTING SYSTEM AND STRUCTURE THEREFOR
Filed Dec. 3, 1959 3 Sheets-Sheet 3

INVENTOR:
PAUL C. ANDREWS
BY Gravely, Lieder & Woodruff
ATTORNEYS.

United States Patent Office 2,991,116
Patented July 4, 1961

2,991,116
VEHICLE LIGHTING SYSTEM AND
STRUCTURE THEREFOR
Paul C. Andrews, 3959 Roland Blvd., Normandy, Mo.
Filed Dec. 3, 1959, Ser. No. 857,217
4 Claims. (Cl. 296—28)

This invention relates to improvements in lighting systems for vehicles and to certain structure incorporated in a vehicle for the system.

The embodiment of this invention selected for disclosure herein relates to truck trailers for which a plurality of operating lights must be provided. Heretofore, trailer lighting installations have been confined almost exclusively to those in which each light unit or fixture is wired from an interior system of current carrying wires. It is believed that the use of interior wiring for truck trailers is a carry over from building wiring methods where great stress has been put upon concealing the wiring for protection. Thus, the stringing of wiring systems according to building methods has introduced problems of placement in the structure of a trailer so as not to run the wiring through zones where inteference and danger might arise from the operation of the trailer or be occasioned by damage to the trailer enclosing walls and panels by the load carried therein. A further problem has been found in fire hazards due to enclosed wiring and difficulty in getting to shorts in the wiring system after the trailer is loaded. It is also recognized that the known methods of installing trailer lighting systems consume many hours and require the services of experienced workers. All of this increases the cost of turning out a trailer and adds to the expense of effecting repairs.

It is, therefore, an important object of this invention to provide an improved system of lighting for vehicles which will obviate the problems of installation and repair, effect a saving in time and expense, and make it possible to increase the safety of the wiring to avoid fire and to protect the light units or fixtures.

It is also an object of this invention to construct a trailer with novel structural provisions and means which will facilitate the installation of the lighting system and permit the use of simple wiring harness layouts.

Another object of this invention is to provide a wiring system for vehicles which may be installed from the exterior so that a substantial saving can be realized and hazards from electrical faults and fire can be overcome.

A further object of this invention is to provide a vehicle with improved structural parts which will provide protected exterior wire-ways.

A still further object of this invention is to provide structural parts in a vehicle adapted for use in various sizes and lengths so that standard wiring harness assemblies may be employed and wiring harness junctions are easily made.

Other objects of this invention are to be found in the various parts and components hereinafter disclosed and claimed with reference to the preferred embodiment thereof illustrated in the accompanying drawings, wherein:

FIG. 1 is a longitudinal side view of a truck trailer which will furnish the structure for understanding the principles of the present invention;

FIG. 2 is an end elevational view of the trailer shown in FIG. 1, the view being the rear end thereof;

FIG. 3 is the elevational view of the front end of the trailer shown in FIG. 1;

FIG. 4 is a fragmentary transverse sectional elevational view, on an enlarged scale, seen at line 4—4 in FIG. 1;

FIG. 7 is a perspective diagram of the wiring harness system applicable to a trailer of the type shown in FIG. 1 and illustrating the principles of the exterior installation thereof.

Figure 6:
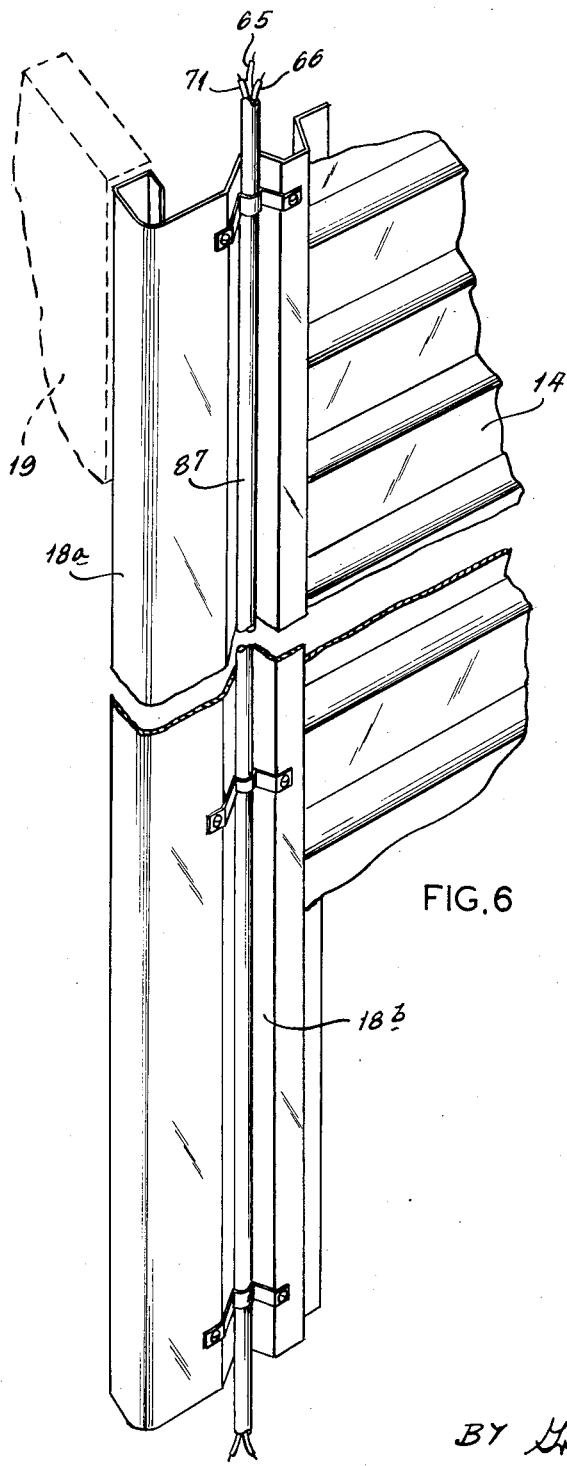
FIG. 6 is a fragmentary perspective view of the right rear corner post showing the exterior run of the wiring harness.
Figure 5:
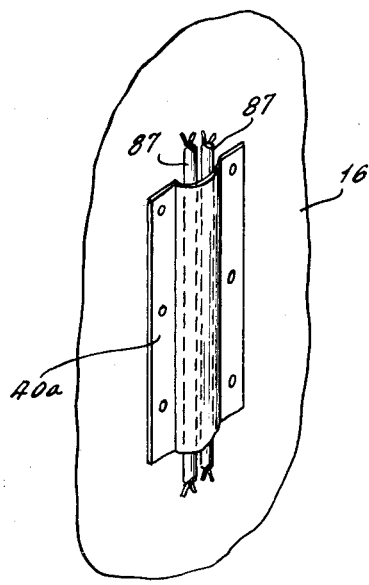
FIG. 5 is a fragmentary perspective view of a portion of the front end of the trailer showing the cover for the wiring harness.

In the views of Figs. 1, 2, 3 and 4, the trailer 10 comprises a body assembly of any usual design having a roof 11 carried upon transverse roof ribs 12 extending between longitudinal or side roof rails 13. The rails 13 are carried across the ends as shown in FIGS. 2 and 3. The body is enclosed by corrugated side sheets 14 secured to a plurality of vertical posts 15 as indicated in FIG. 4, and the posts support the rails 13. The front end of the trailer body 10 is enclosed by other wall sheets 16 and rounded corner members 17. The rear end is provided with a frame assembly generally indicated at 18 in FIG. 2, and doors 19 are carried on hinges 20. A corner post 18a of the frame assembly has been shown in more detail in FIG. 6. The body 10 has a plurality of transverse load carrying stringers 21 (FIG. 4) suitably secured to the longitudinal side and front end rails 22 so that a frame is formed to support a system of flooring 23 for the lading. The rear end door sill supporting member 22a is of box section or other form to enclose the wiring which must then be reached from beneath the flooring. The remainder of the trailer components, such as the tandem wheels and landing gear, is of usual character and need not be described in detail unless it may become necessary to a full understanding of the improvements now to be described in greater detail.

Turning now to FIG. 4, the trailer body 10 is seen to include the roof rail 13 which is a unitary member having a wide longitudinal web 24 formed with an intermediate flange 25 and an upper flange 26, both flanges projecting outwardly to form an external wire-way channel, and the flange 25 having a lip 25a. The rail 13 also is provided with inwardly extending spaced flanges 27 and 28 to form a seat for the roof ribs 12. Flange 28 is connected to the main vertical web 24 of the rail by an angular portion 29 which with the adjacent portion of the web 24 forms a longitudinal gutter 30 just under and within the overhanging margin of the roof 11 so that any leakage which may develop about the rivets holding the roof sheets at this area can be collected and drained away at one or more suitable outlet passages 31 spaced along the rail and opening from the gutter 30 into the wire-way channel so as not to endanger the wiring installation later to be described. The rail 13 is secured to the upper ends of the side wall posts 15 within the space formed by the lower margin of web 24 and the intermediate flange 25. The wall sheets 14 are secured to the posts 15, as indicated, and the upper margins are secured to the flange lip 25a. The roof rail 13 is structurally strong in bending under forces applied in the plane of the web 24 and the side flanges 25, 26, 27 and 28 stiffen the member in the lateral direction of applied forces.

Still referring to FIG. 4, the lower rail 22 is a unitary member having a wide longitudinal web 32 formed with an intermediate flange 33 and a lower flange 34, both flanges projecting outwardly to form an external wireway channel. The rail 22 also is provided with an inwardly extending flange 35 which cooperates with the flooring system 23 and serves to locate the rail and transverse stringers 21 in proper positions. The lower rail 22 possesses the same structural characteristics exhibited by the roof rail, and, in addition to being a more susbtantial member, the flange 33 is formed with a lip 36 which carries an external rub strip 37 and forms an anchorage for the margin of the wall sheets 14. The flange 34, likewise, is formed with a lip 38 to give it added strength. It can be appreciated that the lower rail 22 is positioned on the trailer body 11 in a place where it is frequently contacted by other objects and must have an extra degree of strength as well as protection.

The trailer structural assembly of FIG. 4 provides greater strength than other assemblies of comparable weight due to the wide web rails having lateral flanges to assist in maintaining the rails straight. Furthermore, the relation of flanges 25 and 33 to the respective rail webs 24 and 32 provides a means for seating the ends of the posts 15 and yields a light weight frame for the wall sheets 14. Due to the frame structure, the trailer may be provided with inside sheets to form an exterior post wall without other alterations, and in either type of wall there is no alteration needed in the provisions for the electrical wiring system.

In the views of FIGS. 1, 3, 5 and 7 inclusive, the trailer 10 is shown provided with the usual electrical current supply junction box 40 at the front end, the current being supplied to a distribution unit therein which is supplied from the tractor which is not shown. By comparison with a central junction box, the lighting to be supplied therefrom is scattered over the structure of the trailer, as will be pointed out. The rear end of the trailer (FIG. 2) is equipped with the usual tail light and stop signal unit 41 and turn signal lamps 42, 43. In addition, the trailer is provided with a plurality of front end running light fixtures 44 and 45 at the roof rail 13, and a plurality of running light fixtures along the right an dleft sides, shown respectively at 46, 47 and 48 along the left side from front to rear, and at 49, 50 and 51 along the right side from front to rear. Also, the trailer is provided with other running light fixtures at the lower forward sides at 52 and 53, and rear end upper running light fixtures 54 and 55. It is usual to mount a cluster of light fixtures near the center of the rear at 56 and center of the front at 56a, both at the upper rail, and to mount fixtures at each lower rear side at 57 58. All of these lights heretofore have been usually disposed on some convenient external surface of the trailer where they project outwardly and are constantly subject to being hit and damaged, while the wiring therefore has been strung on the interior. However, in the present invention all of the running light fixtures are disposed in protected places free from being hit or damaged, and the wiring system for the running lights as well as all of the other light fixtures is externally located in keeping with the stated objects.

The details of the improvements in the dispostion of the lights and the wiring system are shown to advantage in FIGS. 4, 5, 6 and 7. As a tyical example of the character of fixtures suitable for this invention, the upper running light fixture 48 (FIG. 4) comprises a base 48a mounted within the wire-way channel of the roof rail 13 so that the enclosing transparent cover 48b lies within the protection of the flanges 25 and 26 where it is fully visible but cannot be hit. Similarly, the lower running light fixture 58, having a base 58a and a cover 58b, is mounted in the wire-way channel of the lower rail 22. This disposition of lights is an important improvement and one that has not heretofore been found in connection with the construction of roof and lower rails 13 and 22 rspectively, to accommodate the lights and a substantially complete system of external wiring by use of wiring harnesses now to be more particularly described in connection with FIG. 7, reference being made to other views where necessary.

In FIG. 7, and starting at the electrical current junction box 40, a system of electrical wiring harnesses is provided, the harnesses being made in sections so that one or more sections may be employed to suit the height and length of each trailer. Such harness sections may be made prior to installation and suitable connectors are used to join the sections as the installation takes place. This has been found of great advantage and reduces the time and cost involved. For example, several leader harnesses 60, 61, 62 and 63 are united by connectors 64 (all connectors are the same, and the same numeral 64 will be applied) and will extend from the box 40 upwardly in a cover channel 40a to the upper front rail 13, to the right corner and along the roof rail 13. The leaders 60, 61, 62 and 63 extend in the upper portion of the wire-way channel under the flange 26 thereof. The leader 63 passes into the corner groove (FIG. 6) of the rear door frame 18 and joins a harness 65 for tail light 41. In the same way, the turn signal lamp 42 has its harness 66 in a circuit with a plurality of leader harnesses 67, 68, 69 and 70, the last one running into the box 40 through the cover 40a. Similarly, the running light fixture 58 has a harness 71 which includes the rear light 55, and is associated with harness 73 for the rear end center light cluster 56. Harness 71 connects to harness 72 for fixture 51, and to harness 74 for fixture 50. A harness 75 contains the light fixture 49 and connects to harness branch 76a of the harness 76 leading from the box 40. The branch 76a also includes fixture 44 and connects to a harness for the front end cluster 56a to complete the circuit. The opposite or left side of the trailer has a harness 77 extending from the box 40 and protected by cover 40a to rail 13 where it passes to the left side to connect with harnesses 78, 79 and 80 disposed in the externally open wire-way channel of such roof rail 13. The final harness 81 connects to the turn signal lamp 43. In like manner, a branch 76b of harness 76 includes the fixture 45 and connects to harness 82 for running light fixture 46. Harness 82 joins harness 83 for fixture 47 and continues on to join harness 84 for fixture 48. A final harness 85 extends to the lower side fixture 57 and includes fixture 54. Also, a branched harness extends from the box 40 to the lower front rail 22 under a cover 40b, the branch 86a connecting with fixture 53 and branch 86b connecting with fixture 52.

While the wiring diagram of FIG. 7 has been conveniently drawn with the several harnesses separately shown, it is intended to string the harness wires in a single bundle wherever possible, and the same will be designated by the numeral 87 in the other views. Therefore, it is to be understood in considering the diagram of FIG. 7 that the several harness wires will be combined in suitable bundles 87, and that, except for the runs under front cover 40a and 40b, and in the external vertical grooves 18b at the corners of the trailer, in posts 18a at the corners of the trailer, the bundles will be placed in the roof rail 13 and the lower rail 22, as shown in FIGS. 1 to 4, where the same may be installed from the exterior. An important advantage of the harness system resides in providing the fixtures 47 and 50 along the roof rails 13 in separate intermediate harnesses, that is to say harnesses which are intermediate of the length of the trailer so that these harnesses may be varied in length depending on the trailer length.

The foregoing description of a preferred embodiment of this invention has set forth the principles thereof and in what manner the same may be applied in practice. It is understood, of course, that those skilled in this art may devise variations to suit conditions, and it is the aim to include all such variations and equivalent systems and supporting structural provisions within the spirit and scope of the appended claims.

What is claimed is:

1. In vehicle lighting, a body having an interior lading space defined by a vertical wall, a rail member on said body formed with a web in said vertical wall and spaced flanges extending outwardly of said wall relative to the body interior, said spaced flanges defining an outwardly open channel way therebetween, a lighting fixture mounted within said channel way between said flanges, and electrical wiring disposed in said channel way and connected to said fixture, said fixture being exposed to view and said wiring being accessible from the exterior of said body.

2. In a vehicle lighting, a body having a lading enclosing wall, a wall framing structural member having a web connected to said wall, a pair of spaced flanges on said web extending outwardly relative to the lading space and forming an open channel adjacent the exterior of said wall, lighting means mounted in said channel to be externally visible, and electrical wiring means connected to said lighting means and fastened within said open channel adjacent said web and one of said flanges to be protected thereby.

3. In a vehicle body wall construction, a lower rail member, posts secured at the lower ends to said lower rail member and extending vertically, an upper rail member secured to the upper ends of said posts, side sheets carried by said posts forming the closure for the body wall, each of said rail members being formed at one side thereof with spaced flanges longitudinally directed and defining open longitudinal channels, one flange on each rail member cooperating with said posts and forming longitudinal margins for the body wall, each of said one flange on said rail members having a lip thereon with said upper rail flange lip being secured at the outer surface of said side sheets, and a roof for the body, said roof being connected to another flange on said upper rail member.

4. In a vehicle body assembly the combination of a vertical sheet wall, a lower rail and an upper rail connected to said vertical sheet wall and extending horizontally thereof, a vertically directed post extending between said rails and connected to said sheet wall adjacent one end, each of said rails and said post being formed with an outwardly opening wire-way channel, the channel in said post opening to the channel in each rail, electrical lights mounted in said rail channels and being recessed thereby in said wall, interconnected current carrying wiring harness sections disposed in said rail channels and post channel, one end of one of said sections being connected to a source of current and the others being connected in series and connected to said electrical lights, and means holding said harness sections within said respective channels.

References Cited in the file of this patent

UNITED STATES PATENTS

| | | |
|---|---|---|
| 2,003,287 | Fitch | June 4, 1935 |
| 2,069,238 | Fraser | Feb. 2, 1937 |
| 2,086,524 | Clark | July 13, 1937 |
| 2,812,973 | Pritchard | Nov. 12, 1957 |